United States Patent
Fujita et al.

(10) Patent No.: US 12,103,769 B2
(45) Date of Patent: Oct. 1, 2024

(54) TRANSFER DEVICE

(71) Applicant: Daifuku Co., Ltd., Osaka (JP)

(72) Inventors: Takashi Fujita, Hinocho (JP); Kunihiro Tsukamoto, Hinocho (JP); Akira Emoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 458 days.

(21) Appl. No.: 17/441,894

(22) PCT Filed: Mar. 10, 2020

(86) PCT No.: PCT/JP2020/010325
§ 371 (c)(1),
(2) Date: Sep. 22, 2021

(87) PCT Pub. No.: WO2020/203097
PCT Pub. Date: Oct. 8, 2020

(65) Prior Publication Data
US 2022/0194700 A1 Jun. 23, 2022

(30) Foreign Application Priority Data
Mar. 29, 2019 (JP) ................ 2019-066947

(51) Int. Cl.
*B65G 1/04* (2006.01)
*B25J 13/08* (2006.01)
*B66F 9/18* (2006.01)

(52) U.S. Cl.
CPC .......... *B65G 1/0435* (2013.01); *B25J 13/085* (2013.01); *B66F 9/183* (2013.01)

(58) Field of Classification Search
CPC .................................................. B65G 1/0435
USPC ............................................................ 414/280
See application file for complete search history.

(56) References Cited

U.S. PATENT DOCUMENTS

| | | | | |
|---|---|---|---|---|
| 4,856,956 A | * | 8/1989 | Zur ....................... | B65G 1/0435 414/280 |
| 5,564,880 A | * | 10/1996 | Lederer ................ | B65G 1/0435 414/280 |
| 8,956,099 B2 | * | 2/2015 | Olszak ................ | B66F 9/07 414/280 |

(Continued)

FOREIGN PATENT DOCUMENTS

| | | |
|---|---|---|
| AT | 506221 A4 | 7/2009 |
| CN | 108045825 A | 5/2018 |

(Continued)

*Primary Examiner* — Mark C Hageman
(74) *Attorney, Agent, or Firm* — The Webb Law Firm

(57) ABSTRACT

A transfer device includes: a mounting unit (132) on which a target article (90) is to be mounted; and a transfer unit (T) that transfers the target article (90) between a storage unit (A) and the mounting unit (132), the transfer unit (T) includes a first transfer device (10T) that holds the target article (90) and moves the target article (90) in a depth direction (L), and a second transfer device (20T) that moves a portion of the target article (90) in the depth direction (L), the portion being mounted on the mounting unit (132), a first transfer distance (dl) by which the target article (90) is to be moved by the first transfer device (10T) is shorter than a total transfer distance by which the target article (90) is to be moved in the depth direction (L) between the mounting unit (132) and the storage unit (A).

10 Claims, 8 Drawing Sheets

(56) References Cited

U.S. PATENT DOCUMENTS

| | | | |
|---|---|---|---|
| 9,994,394 B2 * | 6/2018 | Masuda | B65G 1/0421 |
| 10,618,732 B2 * | 4/2020 | Iwata | B65G 1/137 |
| 11,827,451 B2 * | 11/2023 | Iwata | B65G 1/0492 |
| 2006/0245862 A1 * | 11/2006 | Hansl | B65G 1/0435 |
| | | | 414/281 |
| 2013/0142600 A1 | 6/2013 | Ogawa | |
| 2016/0068372 A1 | 3/2016 | Kashihara et al. | |
| 2016/0167879 A1 | 6/2016 | Masuda | |
| 2018/0339858 A1 * | 11/2018 | Iwata | B65G 1/137 |

FOREIGN PATENT DOCUMENTS

| | | |
|---|---|---|
| EP | 0733563 A1 | 9/1996 |
| JP | 5183379 | 7/1976 |
| JP | 6144509 A | 5/1994 |
| JP | 912105 A | 1/1997 |
| JP | 2000185806 A | 7/2000 |
| JP | 2004203528 A | 7/2004 |
| JP | 2004203529 A | 7/2004 |
| JP | 2012121723 A | 6/2012 |
| JP | 2012218927 A | 11/2012 |
| JP | 20177786 A | 1/2017 |
| JP | 201943726 A | 3/2019 |
| WO | 2012029339 A1 | 3/2012 |
| WO | 2013125322 A1 | 8/2013 |

* cited by examiner

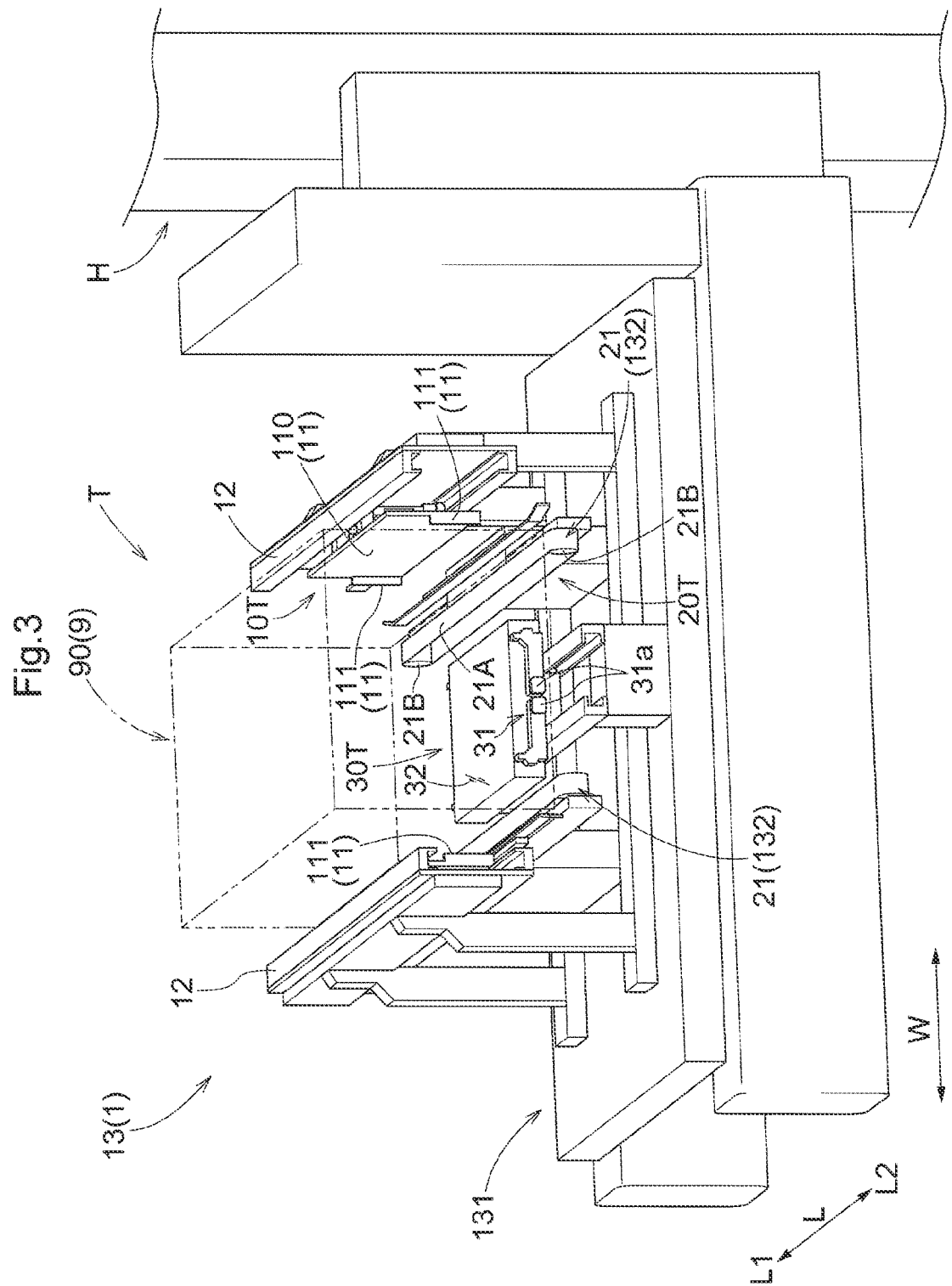

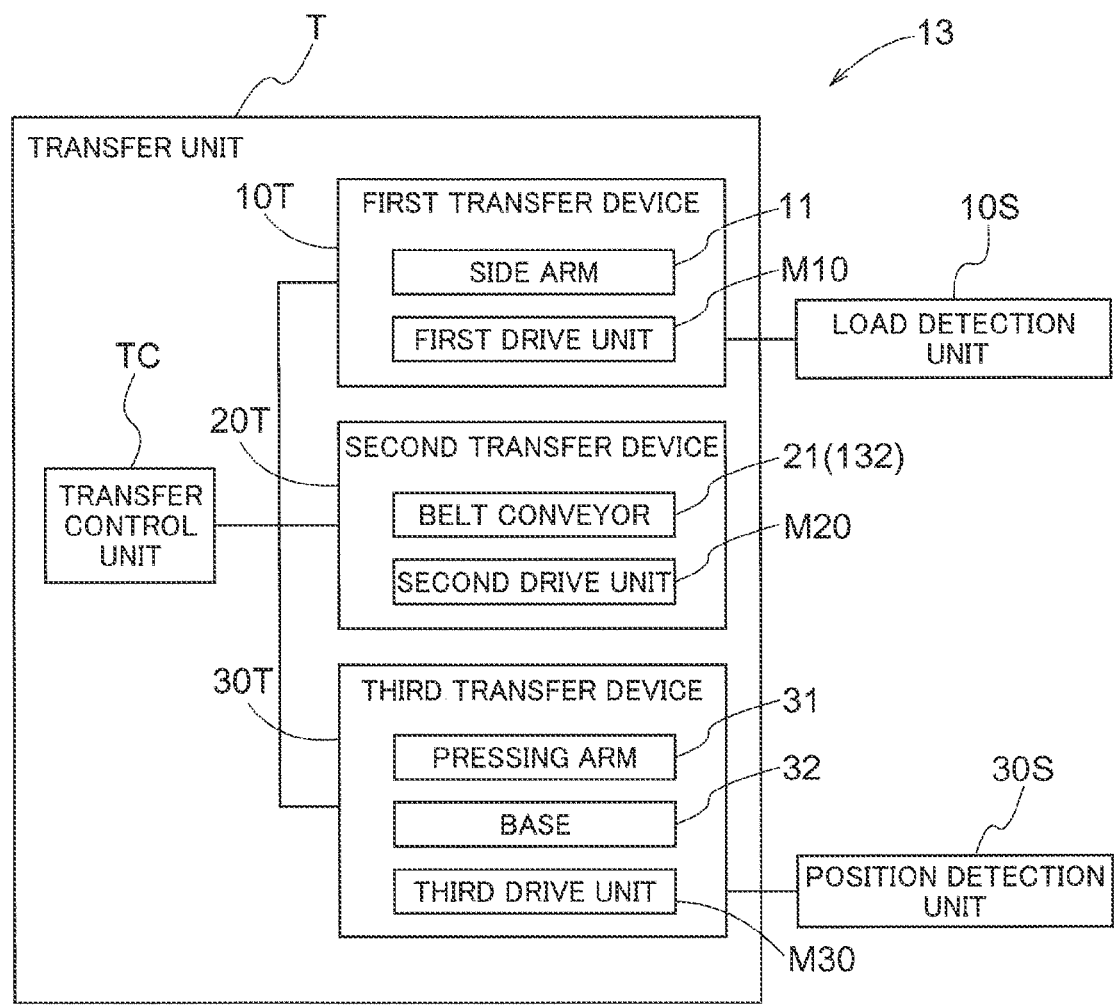

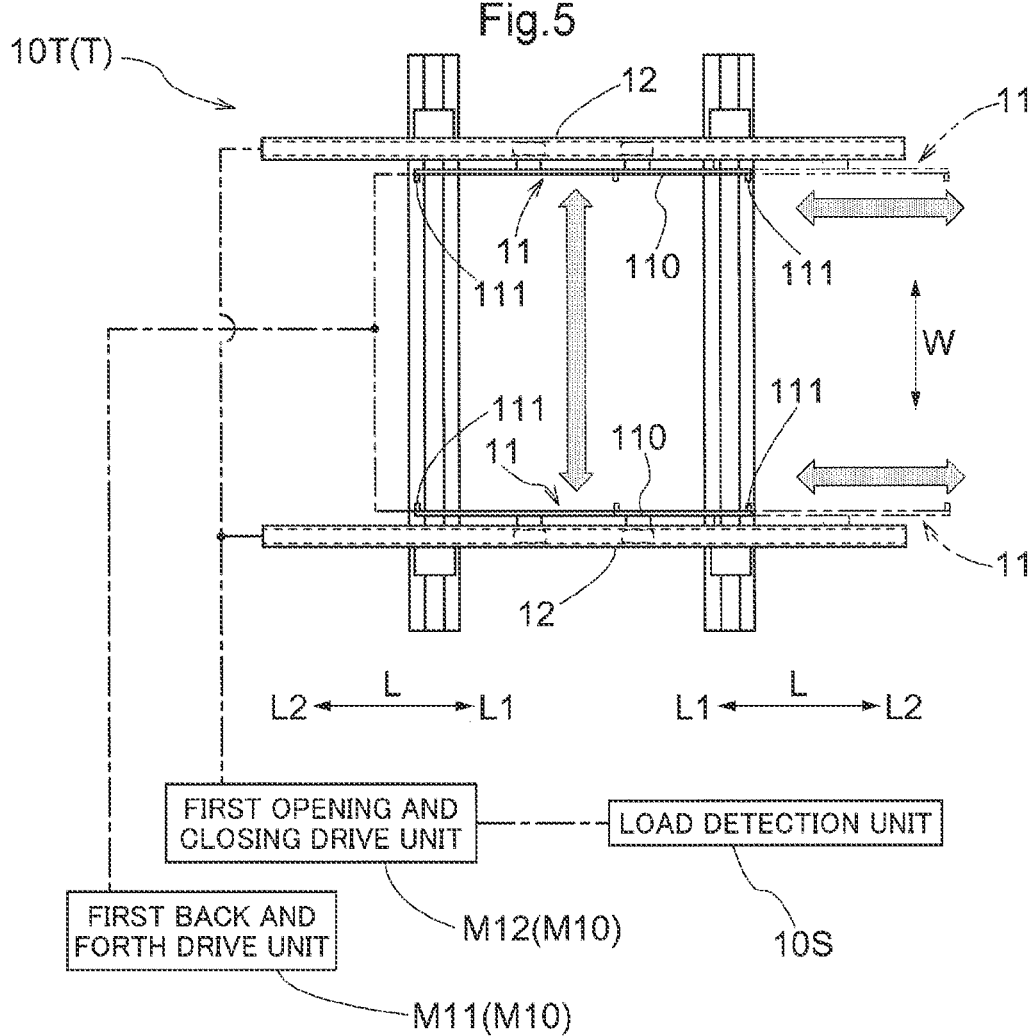
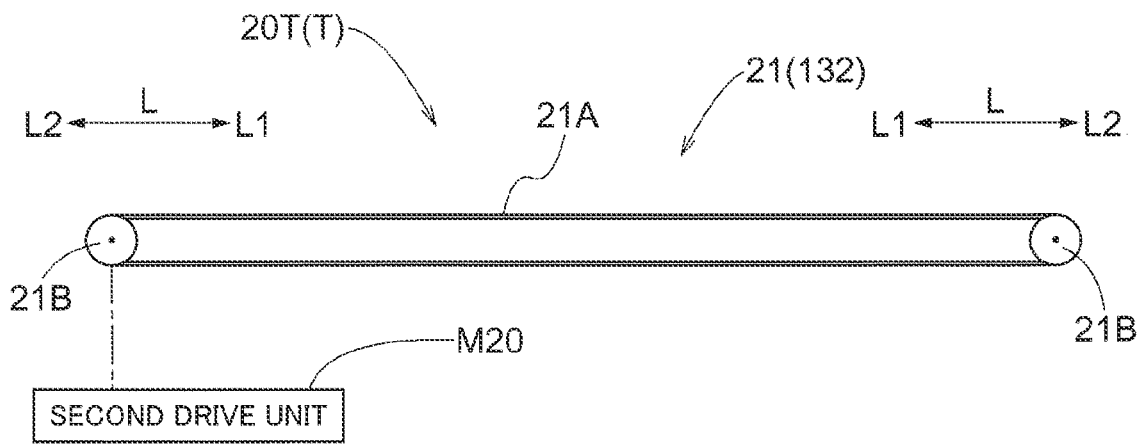

TRANSFER DEVICE

CROSS-REFERENCE TO RELATED APPLICATIONS

This application is the United States national phase of International Application No. PCT/JP2020/010325 filed Mar. 10, 2020, and claims priority to Japanese Patent Application No. 2019-066947 filed Mar. 29, 2019, the disclosures of which are hereby incorporated by reference in their entirety.

BACKGROUND OF THE INVENTION

1. Field of the Invention

The present invention relates to a transfer device for transferring a target article to and from a storage unit that stores an article.

2. Description of Related Art

An example of such a transfer device is disclosed in JP 2004-203528A (Patent Document 1). Hereinafter, the reference numerals given in parentheses in the description of the background technology are those in Patent Document 1.

According to the technology described in Patent Document 1, an article (a tray 20) is transferred between a plurality of storage units (15) provided in an automated warehouse (10) by a load transfer device (30) provided in the stacker crane (12). The load transfer device (30) includes a pair of side arms (back and forth mechanisms 71) that hold the article (20) from both sides in the width direction thereof, and move it back and forth relative to a storage unit (15). The load transfer device (30) is configured to transfer the article (20) to and from a storage unit (15), using the pair of side arms (71).

Patent Document 1: JP2004-203528A

SUMMARY OF THE INVENTION

However, according to the technology described in Patent Document 1, each of the pair of side arms (71) includes a lower plate (52), an upper plate (70), and a middle plate (72) that are stacked in the width direction, and two linear guides (73, 74) that slidably connect these plates in forward and backward directions. Therefore, the size of the side arm (71) in the width direction thereof is likely to be large. As a result, in the technique described in Patent Document 1, the dimension in the width direction of the load transfer device (30) including the pair of side arms (71) tends to be increased.

Also, according to the technology described in Patent Document 1, the pair of side arms (71) configured as described above transfer the article (20) to a storage unit (15) in the state of holding the article (20) from both sides in the width direction, and therefore it is necessary that the interval between a plurality of storage units (15) adjacent to each other in the width direction is set to be large so that the side arms (71) do not come into contact with other articles (20) stored in the storage units (15) that are adjacent to the storage unit (15) at the transfer destination, in the width direction. As a result, according to the technology described in Patent Document 1, a dead space in which an article (20) is not stored in the automated warehouse (10) is likely to be large, and there is room for improvement in storage efficiency.

In view of the above situation, a transfer device that can be downsized in the width direction thereof and can increase storage efficiency in a storage area where an article is to be stored is desired to be realized.

A transfer device according to the present disclosure is
a transfer device for transferring a target article to and from a storage unit that stores an article, the transfer device including:
a mounting unit on which the target article is to be mounted; and
a transfer unit that transfers the target article between the storage unit and the mounting unit by moving the target article in a depth direction of the storage unit,
wherein a direction that is orthogonal to the depth direction in a horizontal plane is defined as a width direction,
the transfer unit includes
a first transfer device that has a pair of side arms, holds the target article using the pair of side arms, and moves the target article in the depth direction, the pair of side arms being respectively provided on two sides, in the width direction, of the target article mounted on the mounting unit and move back and forth in the depth direction, and
a second transfer device that moves a portion of the target article in the depth direction, the portion being mounted on the mounting unit,
a first transfer distance by which the target article is to be moved by the first transfer device is shorter than a total transfer distance by which the target article is to be moved in the depth direction between the mounting unit and the storage unit, and
the transfer unit uses the second transfer device to move the target article by a distance by which the first transfer distance is shorter than the total transfer distance.

According to this configuration, the first transfer distance by which the target article is moved by the first transfer device is set to be shorter than the total transfer distance that is the distance by which the target article is moved between the mounting unit and the storage unit. Therefore, it is possible to reduce the amount of back and forth movement of the side arms of the first transfer device in the depth direction. Therefore, it is possible to downsize the dimension of the side arms in the depth direction, and it is easier to secure the strength of the side arms when there are in a state of protruding in the depth direction. Therefore, with this configuration, it is possible to reduce the dimension in the width direction of each of the pair of side arms of the first transfer device while ensuring the required strength. As a result, it is possible to downsize the entire transfer device in the width direction.

In addition, when a plurality of storage units for storing articles are lined up in the width direction, it is necessary to set the arrangement interval in the width direction of the plurality of storage units so that the side arms that move back and forth do not come into contact with an article. With the configuration, it is possible to reduce the dimension of the side arms in the width direction, and therefore it is possible to reduce the arrangement interval of the plurality of storage units in the width direction, and it is easier to improve the storage efficiency of a storage place that includes the plurality of storage units.

Further features and advantages of the technique according to the present disclosure will be further clarified by the following illustration of exemplary and non-limiting embodiments described with reference to the drawings.

BRIEF DESCRIPTION OF THE DRAWINGS

FIG. 3 is a perspective view of a transfer device.

FIG. 4 is a control block diagram for a transfer device.

FIG. 5 is a diagram schematically showing a configuration of a first transfer device.

FIG. 6 is a diagram schematically showing a configuration of a second transfer device.

DETAILED DESCRIPTION OF PREFERRED EMBODIMENTS

Figure 1:
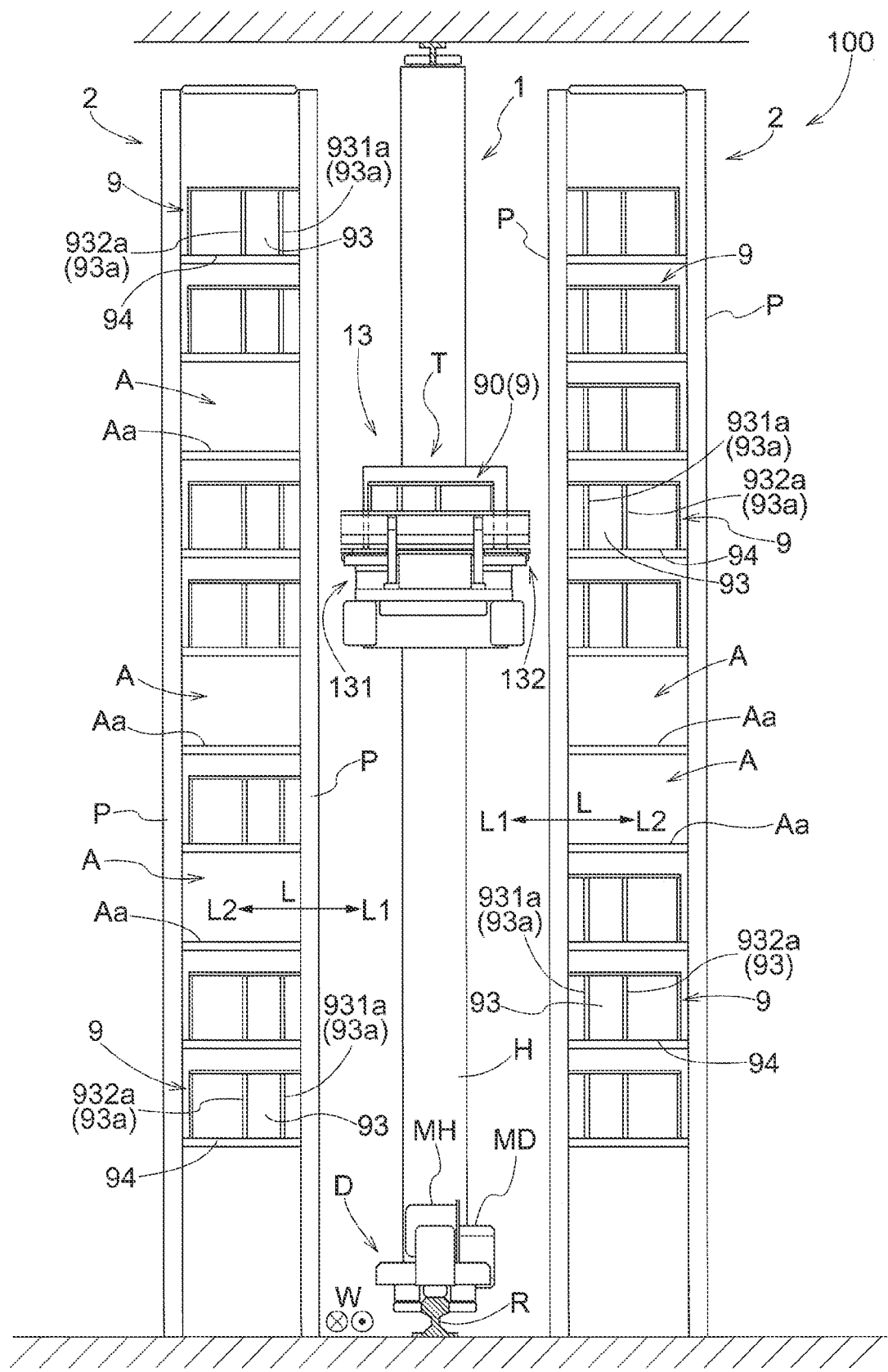
FIG. 1 is a widthwise view of an article storage facility.

The following describes a transfer device according to the present embodiment with reference to the drawings. For example, as shown in FIGS. 1 and 2, a transfer device 13 is applied to an article transport device 1 that transports a target article 90 that is to be transported (transferred) in an article storage facility 100 that stores a plurality of articles 9.

Schematic Configuration of Article Storage Facility

First, a schematic configuration of the article storage facility 100 will be described.

Figure 2:
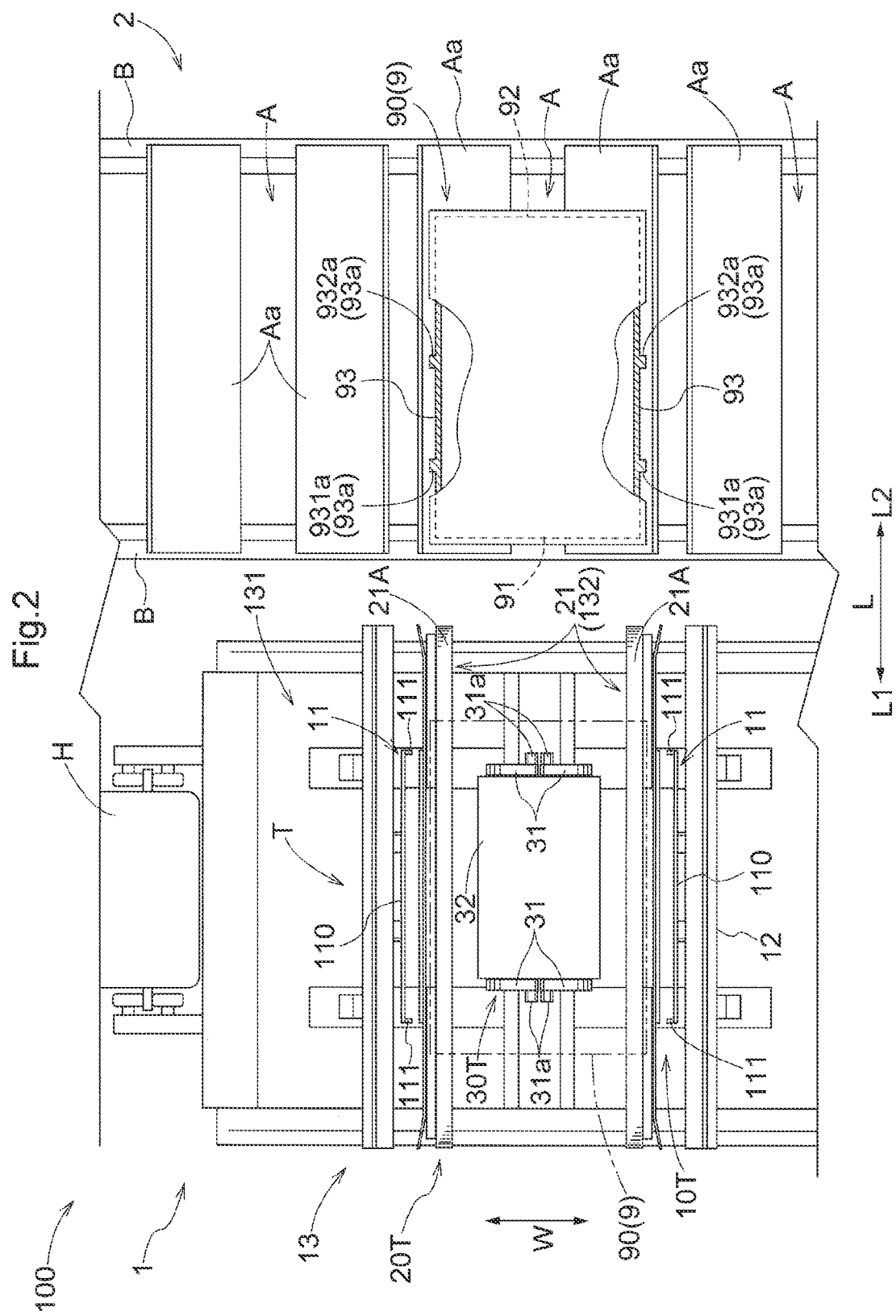
FIG. 2 is a plan view showing a part of the article storage facility.

As shown in FIGS. 1 and 2, the article storage facility 100 includes an article transport device 1 that transports articles 9, and article storage shelves 2 that each store a plurality of articles 9. In the example shown in the drawings, a pair of article storage shelves 2 are provided so as to sandwich one article transport device 1.

Each storage shelf 2 includes a plurality of storage units A. Each of the plurality of storage units A is configured to be able to store an article 9. In the present embodiment, the plurality of storage units A are arranged in a vertical direction and a width direction W.

The article transport device 1 includes a transfer device 13 that includes a mounting unit 132 on which the target article 90 is to be placed, and transfers the target article 90 between the mounting unit 132 and the storage units A. The article transporting device 1 is configured to be able to move the transfer device 13 to positions (transfer positions) that respectively face the plurality of storage units A provided in the storage shelves 2. The article transport device 1 is configured to perform a transfer operation to transfer the target article 90, using the transfer device 13 in a state where the transfer device 13 is located at a transfer position corresponding to one of the storage units A. In the present embodiment, the article transport device 1 is configured to be able to move the transfer device 13 in the vertical direction and the width direction W. As a result, using the transfer device 13, the article transport device 1 can transfer the target article 90 to and from any storage unit A selected from among the plurality of storage units A provided in the storage shelves 2.

In the following description, the direction in which the target article 90 is moved by the transfer device 13 with respect to a storage unit A is defined as a depth direction L, and the direction orthogonal to the depth direction L in a horizontal plane is defined as a width direction W. The side of the mounting unit 132 with respect to the storage unit A in the depth direction L is defined as a depth direction front side L1, and the side of a storage unit A with respect to the mounting unit 132 in the depth direction L is defined as a depth direction rear side L2.

Note that, in this description, terms related to dimensions, placement directions, placement positions, etc. of each member are used as concepts that each include a difference caused by an error (an error that is acceptable in manufacturing).

Article Storage Shelves

Next, the configuration of each storage shelf 2 will be described.

As shown in FIGS. 1 and 2, each storage shelf 2 includes a plurality of pillar members P that extend in the vertical direction, a plurality of beam members B that extend in the width direction W, and a plurality of storage units A that store articles 9.

The plurality of pillar members P are regularly arranged at intervals in the depth direction L and the width direction W. Also, the plurality of beam members B are arranged at intervals in the depth direction L and the vertical direction so as to connect the plurality of column members P arranged in the width direction W.

In the present embodiment, each of the storage units A includes mounting members Aa supported by a beam member B. An article 9 is to be mounted on each mounting member Aa. An article 9 is stored in the storage unit A in the state of being mounted on a mounting member Aa. In this example, one storage unit A includes a pair of mounting members Aa arranged in the width direction W. In the example shown in the drawings, each mounting member Aa is constituted by a plate-shaped member with a constant width, whose main surface faces in the vertical direction and which extends in the depth direction L. However, the mounting members Aa are not limited to such a configuration, and, for example, a mounting member Aa composed of one plate-shaped member, or a mounting member Aa composed of a plurality of rod-shaped members, may be provided in one storage unit A.

In the example shown in FIG. 1, a pair of article storage shelves 2 with the above-described configuration are arranged on both sides in the depth direction L with the article transport device 1 interposed therebetween. However, the present invention is not limited to such an example, and the number of article transport devices 1 and the number of article storage shelves 2 installed in the article storage facility 100, and the arrangement configurations of the article transport device 1 and the article storage shelves 2 may be set in any manner.

Article Transport Device

Next, the configuration of the article transport device 1 will be described.

As shown in FIGS. 1 and 2, the article transport device 1 is a device that transports the target article 90 to be transported (transferred) of the articles 9 within the article storage facility 100. The article transport device 1 includes a transfer device 13 for transferring the target article 90 to and from any of the storage units A.

As shown in FIG. 1, in the present embodiment, the article transport device 1 includes a travel unit D that travels on a travel rail R provided in the width direction W, and a mast H that is provided on the travel unit D and extends in the vertical direction. The above-described transfer device 13 is provided so as to be able to move up and down along the mast H. In the present embodiment, the article transporting device 1 is configured as a so-called stacker crane that can transport the target article 90 in both the vertical direction and the horizontal direction (width direction W in this example). Note that, in this example, the article transport device 1 is configured as a monomast type stacker crane configured to move the transfer device 13 up and down using one mast H.

The travel unit D is driven by a travel drive unit MD (a travel motor) and travels on the travel rail R. The transfer device 13 is driven by an elevation drive unit MH (an elevation motor) and moves up and down along the mast H. With such a configuration, the transfer device 13 is movable in the vertical direction and the width direction W, and movable to any of the transfer positions respectively corresponding to the plurality of storage units A provided in the article storage shelves 2.

Transfer Device

Next, a configuration of the transfer device 13 will be described in detail.

The transfer device 13 is a device for transferring the target article 90 to and from any of the storage units A that store articles 9. Here, the target article 90 to be transferred by the transfer device 13 is specified in a transfer command from an upper control device (not shown) that manages the article storage facility 100, of the articles 9, for example. In the present embodiment, each article 9 is a box-shaped article that stores a product or the like.

More specifically, each article 9 is a container that is made of resin such as a container or a so-called foldable container that is fordable.

As shown in FIGS. 1 and 2, in this example, a surface of the article 9 (target article 90) that faces toward the depth direction front side L1 defined as a first surface portion 91, and a surface that faces toward the depth direction rear side L2 is defined as a second surface portion 92. Surfaces of the article 9 (target article 90) that face toward two sides in the width direction W are defined as side surface portions 93, and a surface that faces downward is defined as a bottom surface portion 94. An opening (not shown) that is used to store a content such as a product is provided in the upper surface of the article 9. Note that, in the above description, the first surface portion 91 and the second surface portion 92 are defined in association with the depth direction front side L1 and the depth direction rear side L2 only for convenience of description, and the first surface portion 91 may face toward the depth direction rear side L2 and the second surface portion 92 may face toward the depth direction front side L1 depending on the direction in which the article 9 (the target article 90) is stored. Each of the pair of side surface portions 93 faces toward either one side in the width direction W according to the direction in which the article 9 (the target article 90) is stored.

Each of the pair of side surface portions 93 is provided with a lock-target portion 93a that is to be used when the target article 90 is transferred by the transfer device 13. The lock-target portion 93a is formed in a rib shape that protrudes from the side surface portion 93 in the width direction W and extends in the vertical direction, for example. In this example, the first lock-target portion 931a and the second lock-target portion 932a are provided on each of the pair of side surface portions 93 so as to be separated from each other in the depth direction L. The first lock-target portion 931a is located at a position closer to the first surface portion 91 than the second lock-target portion 932a is. The second lock-target portion 932a is located at a position closer to the second surface portion 92 than the first lock-target portion 931a is. In this example, as shown in FIG. 2, the first lock-target portion 931a and the second lock-target portion 932a are provided on the side surface portions 93 so that the distance from the first surface portion 91 to the first lock-target portion 931a in the depth direction L is shorter than the distance from the second surface portion 92 to the second lock-target portion 932a in the depth direction L. In other words, the distance from a central portion of the side surface portion 93 in the depth direction L to the first lock target portion 931a and the distance from the central portion to the second lock target portion 932a are different from each other. The transfer device 13 according to the present embodiment transfers the such articles 9 (target article 90).

As shown in FIGS. 2 and 3, the transfer device 13 includes a mounting unit 132 on which the target article 90 is to be placed, and a transfer unit T that transfers the target article 90 between any of the storage units A and the mounting unit 132 by moving the target article 90 in the depth direction L of the storage unit A. With such a configuration, the transfer device 13 is configured to be able to transfer the target article 90 to and from the article storage shelves 2 that are each provided with a plurality of storage units A. In the present embodiment, the transfer device 13 is configured to be able to transfer the target article 90 to and from each of the storage shelves 2 (the storage units A) located on the two sides in the depth direction L with the article transport device 1 interposed therebetween (see FIG. 1). In the example shown in the drawings, the transfer device 13 includes a base portion 131 that is supported by the mast H and is supported so as to be able to move up and down relative to the mast H. The above-described mounting unit 132 and the transfer unit T are supported by the base portion 131.

The transfer unit T includes at least a first transfer device 10T and a second transfer device 20T. Furthermore, in this example, the transfer unit T includes a third transfer device 30T. The first transfer device 10T, the second transfer device 20T, and the third transfer device 30T are each configured to move the target article 90 in the depth direction L, and each have a different configuration from the others. As shown in FIG. 4, in the present embodiment, the transfer unit T includes a transfer control unit TC that controls the operations of the first transfer device 10T, the second transfer device 20T, and the third transfer device 30T.

First Transfer Device

As shown in FIGS. 3 to 5, the first transfer device 10T has a pair of side arms 11 that are arranged on the two sides, in the width direction W, of the target article 90 mounted on the mounting unit 132, and move back and forth in the depth direction L, and is configured to hold the target article 90 using the pair of side arms 11 and move the target article 90 in the depth direction L. In the present embodiment, the first transfer device 10T further includes support frames 12 that slidably support the side arms 11 in the depth direction L. The support frames 12 are supported by the base portion 131 and are provided as a pair separated from each other in the width direction W (see FIG. 3).

In the present embodiment, the first transfer device 10T is configured to sandwich and hold the target article 90 from both sides in the width direction W by bringing the pair of side arms 11 close to each other in the width direction W. Further, the first transfer device 10T is configured to release the holding of the target article 90 by separating the pair of side arms 11 from each other in the width direction W from the state of holding the target article 90.

In the present embodiment, the first transfer device 10T includes a first drive unit M10 (see FIG. 4). As shown in FIG. 5, the first drive unit M10 includes a first back and forth drive unit M11 that moves the pair of side arms 11 in the depth direction L (causes them to move back and forth), and a first opening and closing drive unit M12 that moves (opens and closes) the pair of side arms 11 in the width direction W. In the present embodiment, the first back and forth drive unit M11 moves the side arm 11 relative to the support frames 12 in the depth direction L, thereby moving the side arm 11 in the depth direction L so as to advance and retract. The first opening and closing drive unit M12 moves the pair of support frames 12 in the width direction W relative to the base portion 131 (see FIG. 3), thereby moving the pair of side arms 11 supported by the pair of support frames 12, in the width direction W, so as to open and close. For example, an electric motor such as a servo motor or a stepping motor, or a cylinder drive mechanism using air pressure or hydraulic pressure may be used as the driving force sources of the first back and forth drive unit M11 and the first opening and closing drive unit M12.

In the present embodiment, the pair of side arms 11 are respectively provided with locking portions 111 that are formed so as to protrude in the width direction W and face each other. In this example, the first transfer device 10T is configured to hold the target article 90 by bringing the pair of side arms 11 close to each other in the width direction W and locking the locking portions 111 to the lock-target portions 93a (see FIG. 2 and so on) provided on the side surface portions 93 of the target article 90, and release the holding of the target article 90 by separating the pair of side arms 11 from each other in the width direction W and releasing the locking portions 111 from the lock-target portions 93a. More specifically, the pair of side arms 11 move inward in the width direction W and approach each other in a state where the pair of side arms 11 are located outside, in the width direction W, of the target article 90 stored in a storage unit A, and thus the pair of side arms 11 come into contact with or approach the side surface portions 93 of the target article 90 (see FIG. 8(a)). Thereafter, the pair of side arms 11 move to the depth direction front side L1 to lock the lock-target portions 93a of the target article 90, using the locking portions 111. As a result, the target article 90 is held by the first transfer device 10T. Thereafter, from this state, the pair of side arms 11 further move toward the depth direction front side L1 so that the target article 90 moves toward the depth direction front side L1 (see FIG. 8(c)). After the target article 90 has moved, the pair of side arms 11 move outward in the width direction W and the locking portions 111 are separated from the lock-target portions 93a, and thus the holding of the target article 90 by the first transfer device 10T is released.

In the present embodiment, each side arm 11 includes a main body portion 110 that extends in the depth direction L. The above-described locking portions 111 are each provided so as to protrude inward in the width direction W from the main body portion 110, i.e., in the direction toward the other of the pair of side arms 11. In this example, each locking portion 111 is provided on an end portion of the main body portion 110 in the depth direction L. As a result, it is possible to fully utilize the dimension of the side arms 11 in the depth direction L to transfer the target article 90. Therefore, it is possible to downsize the side arms 11 in the depth direction L. Therefore, it is easier to secure the strength of the side arms 11. Also, in this example, the locking portions 111 are provided on two end portions of each main body portion 110 in the depth direction L. As a result, the target article 90 can be transferred to each of the article storage shelves 2 (storage units A) arranged on both sides in the depth direction L with the article transport device 1 interposed therebetween. In the present embodiment, each main body 110 is formed from a plate-shaped member whose main surface faces in the width direction W. As a result, it is possible to downsize the side arms 11 in the width direction W, and accordingly it is possible to downsize the transfer device 13 in the width direction W.

In the present embodiment, the first transfer device 10T further includes a load detection unit 10S that detects a pinching load in a state where the target article 90 is sandwiched by the pair of side arms 11. In this example, the first transfer device 10T is configured to control the amount of inward movement of the pair of side arms 11 in the width direction W based on the result of the detection by the load detection unit 10S. Specifically, the first transfer device 10T performs the following control. That is to say, first, in a state where the target article 90 is located at a midpoint in the width direction W between the pair of side arms 11, the first transfer device 10T moves the pair of side arms 11 inward in the width direction W until they come into contact with the side surface portions 93 of the target article 90. In the state where the pair of side arms 11 are in contact with the target article 90, when the pair of side arms 11 are moved further inward in the width direction W, the target article 90 is sandwiched from both sides in the width direction W, and a pinching load is applied to the pair of side arms 11. In the present embodiment, the load detection unit 10S is configured to detect such a pinching load based on a drive torque output by the first opening and closing drive unit M12 (first drive unit M10).

The driving of the pair of side arms 11 by the first opening and closing drive unit M12 is realized through torque control that is based on the result of detection by the load detection unit 10S. In this example, the pair of side arms 11 are driven inward in the width direction W until the pinching load exceeds a predetermined value Vmax. In other words, the inward driving of the pair of side arms 11 in the width direction W is stopped when the pinching load exceeds the predetermined value Vmax. Each of the side arms 11 have a structure that allows a certain degree of elastic deformation, and therefore, when the pair of side arms 11 sandwich the target article 90 and the pinching load exceeds the predetermined value Vmax, the side arms 11 are in a state of being bent so as to protrude inward in the width direction W. Therefore, in this example, after the pinching load reaches the predetermined value Vmax, the first transfer device 10T separates the pair of side arms 11 from each other so as to stop at a predetermined distance therebetween in the width direction W. Thus, it is possible to set the positional relationship between the side surface portions 93 of the target article 90 and the pair of side arms 11 so as to be in a predetermined state regardless of the dimension of the target article 90 in the width direction W. Therefore, for example, even when the orientation of the target article 90 is different each time, or when a plurality of types of articles that each have a different dimension in the width direction W are regarded as the target article 90, it is unnecessary to perform different control for each case, and it is possible to appropriately hold each of such target articles 90, using the pair of side arms 11.

In the present embodiment, the predetermined distance is such that the locking portions 111 of each of the pair of side arms 11 are separated from the side surface portions 93 of the target article 90 with a gap in consideration of the amount of bending of the side arms 11. The gaps are set to be sufficiently smaller than the length of the protrusions of the lock-target portions 93a from the side surface portions 93 in the width direction W. As a result, it is possible to move the side arms 11 in the depth direction L to lock the pair of locking portions 111 to the pair of lock-target portions 93a in the depth direction L, and when moving the side arms 11, it is possible to prevent the locking portions 111 and the side surface portions 93 of the target article 90 from sliding on each other. Note that the above-described predetermined value Vmax is set to be an appropriate value according to the material, strength, and so on of the side arms 11 and the target article 90.

Second Transfer Device

As shown in FIGS. 3, 4, and 6, the second transfer device 20T is configured to move the portion of the target article 90 mounted on the mounting unit 132 in the depth direction L. Here, the second transfer device 20T is configured to move the portion mounted on the mounting unit 132 of the target article 90, and is not configured to move the portion protruding from the mounting unit 132 of the target article 90 in the depth direction L. That is to say, the second transfer device 20T is configured to come into contact with the target article 90 within the range in which the mounting unit 132 of the transfer device 13 is provided in the depth direction L, and move the target article 90. In the present embodiment, the second transfer device 20T includes belt conveyors 21 that each have a belt 21A wound around a plurality of pulleys 21B. In this example, the second transfer device 20T includes a pair of belt conveyors 21 that are arranged so as to be separate from each other in the width direction W.

In the present embodiment, the second transfer device 20T is configured to support the target article 90 from below, using the pair of belt conveyors 21. In a state of being conveyed (transferred) by the transfer device 13, the target article 90 is mounted on the pair of belt conveyors 21. Therefore, in the present embodiment, the pair of belt conveyors 21 constitute the mounting unit 132 on which the target article 90 is to be mounted. That is to say, the target article 90 that is being conveyed by the transfer device 13 is supported from below by the mounting unit 132. Note that the upper surfaces of the pair of belt conveyors 21 are mounting surfaces on which the target article 90 is to be mounted.

In the present embodiment, the second transfer device 20T includes a second drive unit M20 (see FIGS. 4 and 6). The second drive unit M20 drives the pair of belt conveyors 21. As shown in FIG. 6, the second drive unit M20 rotationally drives at least one of the plurality of pulleys 21B around which the belt 21A is wound, in the forward rotation direction or the reverse rotation direction. As a result, the second transfer device 20T can freely move the target article 90 mounted on the pair of belt conveyors 21 toward the depth direction front side L1 and the depth direction rear side L2. For example, an electric motor such as a servo motor or a stepping motor may be used as the driving force source of the second drive unit M20.

Third Transfer Device

Figure 7:
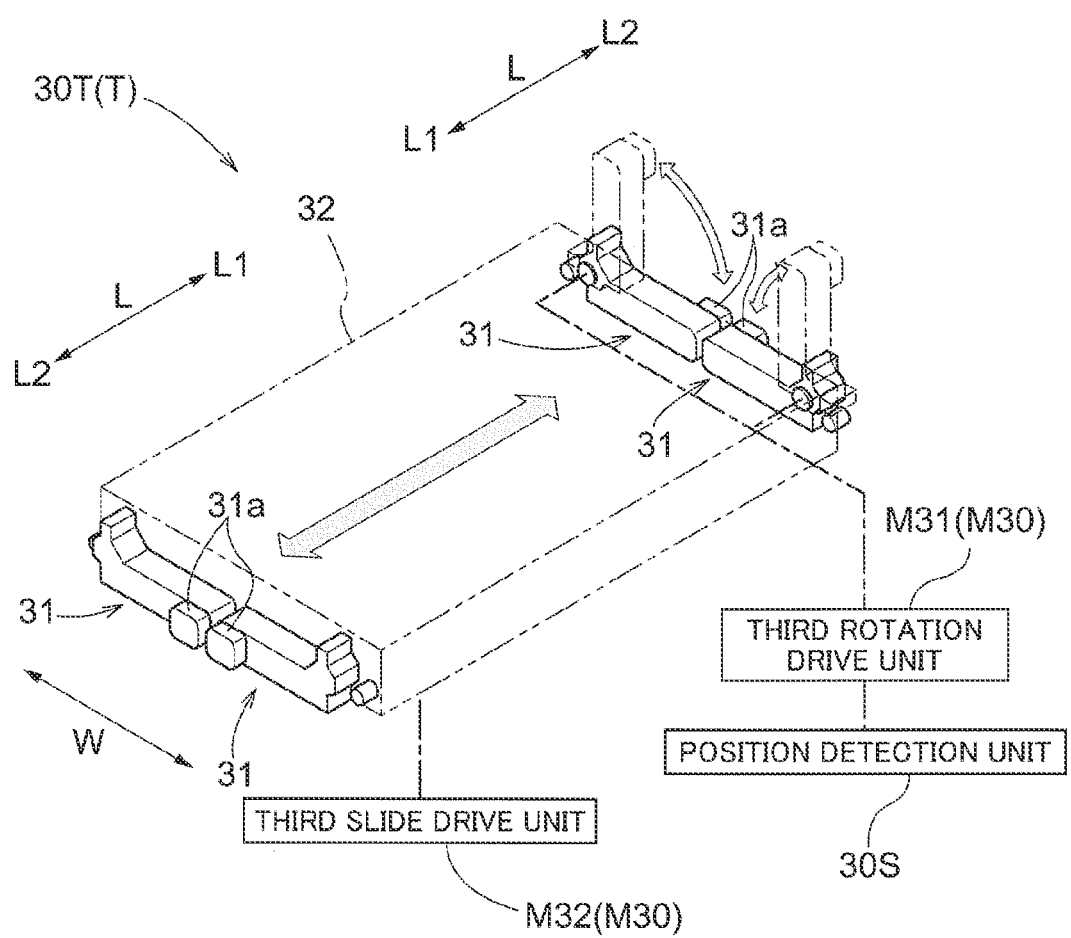
FIG. 7 is a diagram schematically showing a configuration of a third transfer device.

As shown in FIGS. 3, 4, and 7, the third transfer device 30T has pressing arms 31 that press the target article 90 from the depth direction front side L1, and is configured to move the target article 90 toward the depth direction rear side L2, using the pressing arms 31. In the present embodiment, the third transfer device 30T further includes a base 32 that supports the pressing arms 31. The base 32 is provided at a midpoint in the width direction W between the pair of belt conveyors 21 and below the upper surface of the pair of belt conveyors 21 (see FIG. 9). In this example, pressing arms 31 are supported on two end portions of the base 32 in the depth direction L in correspondence with the pair of article storage shelves 2 (storage units A) arranged on both sides in the depth direction L with the transfer device 13 interposed therebetween (see FIG. 1). In the example shown in the drawings, a pair of pressing arms 31 are provided on two end portions of the base 32 in the depth direction L.

In the present embodiment, the third transfer device 30T is configured to press the first surface portion 91 (or the second surface portion 92) of the target article 90 mounted on the pair of belt conveyors 21 (the mounting unit 132) toward the depth direction rear side L2 by moving the pressing arms 31 toward the depth direction rear side L2 in a state where the pressing arms 31 is located on the depth direction front side L1 of the target article 90. As a result, the target article 90 is moved toward the depth direction rear side L2. In this example, the third transfer device 30T is configured to move the pressing arms 31 toward the depth direction rear side L2 by moving the base 32 that supports the pressing arms 31 toward the depth direction rear side L2 relative to the base portion 131 (see FIG. 3). Note that, after moving the target article 90 toward the depth direction rear side L2 using the pressing arms 31, the third transfer device 30T moves the pressing arms 31 toward the depth direction front side L1 by moving the base 32 toward the depth direction front side L1 relative to the base portion 131 (see FIG. 3). Thus, the third transfer device 30T can return the pressing arms 31 to the reference positions at which the pressing arms 31 were located before pressing the target article 90.

In this embodiment, the pressing arms 31 are configured to be able to freely change the state thereof to a protruding state (indicated by a virtual line in FIG. 7) in which the pressing arms 31 protrude to positions that overlap the movement locus of the target article 90 moved by the transfer unit T, and a retracted state (indicated by a solid line in FIG. 7) in which the pressing arms 31 are retracted to positions that do not overlap the movement locus. In this example, the pressing arms 31 are supported on the base 32 so as to be respectively rotatable about axes that extend in the depth direction L, and the state thereof is changed to the protruding state and the retracted state through such rotation.

Also, in the present embodiment, each of the pressing arms 31 includes a pressing portion 31*a* that is provided on an outer portion of the pressing arm 31 in the radial direction with reference to the rotation axis of the pressing arm 31, and that comes into contact with the target article 90 when pressing the target article 90. When the pressing arms 31 are in the protruding state, the pressing portions 31*a* are located above the upper surfaces of the pair of belt conveyors 21 (mounting unit 132) (see FIG. 9(*b*)), and when the pressing arms 31 are in the retracted state, the pressing portions 31*a* are located below the upper surfaces of the pair of belt conveyors 21 (mounting unit 132) (see FIG. 9(*a*)). Note that when the pressing arms 31 are in the retracted state, the entirety of each pressing arm 31 that includes a pressing portion 31*a* is located below the upper surfaces of the pair of belt conveyors 21 (mounting unit 132). With the above-described configuration, when the third transfer device 30T transfers the target article 90, the pressing arms 31 are brought into the protruding state, so that the pressing portions 31*a* press the first surface portion 91 (or the second surface portion 92) of the target article 90 to appropriately move the target article 90. Also, while the first transfer device 10T or the second transfer device 20T is moving the target article 90, it is possible to prevent the pressing arms 31 from hindering the movement of the target article 90, by bringing the pressing arms 31 into the retracted state so as not to overlap the movement locus of the target article 90.

In the present embodiment, the third transfer device 30T includes a third drive unit M30 (see FIG. 4). As shown in FIG. 7, the third drive unit M30 includes third rotation drive units M31 that rotate the pressing arms 31 respectively about axes that extend in the depth direction L, and a third slide drive unit M32 that moves (slides) the base 32 in the depth direction L. In this example, the third rotation drive units M31 are respectively provided for the pairs of pressing arms 31 so as to be able to independently drive the pair of pressing arms 31 on one side in the depth direction L and the pair of pressing arms 31 on the other side in the depth direction L. It is preferable that each pair of pressing arms 31 are configured to rotate synchronously by a gear mechanism or the like. For example, an electric motor such as a servo motor or a stepping motor may be used as the driving force source of each third drive unit M31. The third slide drive unit M32 slides the base 32 relative to the base portion 131 (see FIG. 3) in the depth direction L. For example, an electric motor such as a servo motor or a stepping motor, or a cylinder drive mechanism using air pressure or hydraulic pressure may be used as the driving force source of the third slide drive unit M32.

In the present embodiment, the third transfer device 30T further includes a position detection unit 30S that detects the position of the target article 90 relative to the mounting unit 132 or the third transfer device 30T. In this example, the position detection unit 30S detects the position of the target article 90 relative to the pressing arms 31. The third transfer device 30T is configured to change the state of the pressing arms 31 to the protruding state based on the result of the detection by the position detection unit 30S. Specifically, the third rotation drive units M31 of the third transfer device 30T rotationally drive the pressing arms 31 based on the result of the detection by the position detection unit 30S. For example, in a state where the target article 90 mounted on the mounting unit 132 (the pair of belt conveyors 21) overlaps the pressing arms 31 in a plan view, if the pressing arms 31 are brought into the protruding state, the pressing arms 31 come into contact with the target article 90. Therefore, the position detection unit 30S determines whether or not the target article 90 mounted on the mounting unit 132 overlaps the pressing arms 31 in a plan view, more specifically, whether or not the target article 90 is located on the depth direction rear side L2 with respect to the pressing arms 31. The third transfer device 30T brings the pressing arms 31 into the protruding state only when such a situation is detected by the position detection unit 30S. Note that the position detection unit 30S may be constituted by, for example, an optical sensor, and may be configured to detect the position of the target article 90 according to a state in which the target article 90 blocks the optical axis and a state in which the target article 90 does not block the optical axis. Note that the position detection unit 30S is not limited to such a configuration, and may be constituted by any known type of sensor.

Operations of Transfer Unit

Next, operations performed by the transfer unit T to transfer the target article 90 will be described. The transfer unit T uses the above-described first transfer device 10T, second transfer device 20T, and third transfer device 30T to transfer the target article 90. Note that the operations of the first transfer device 10T, the second transfer device 20T, and the third transfer device 30T are controlled by a transfer control unit TC (see FIG. 4) that is provided in the transfer unit T.

Figure 8:
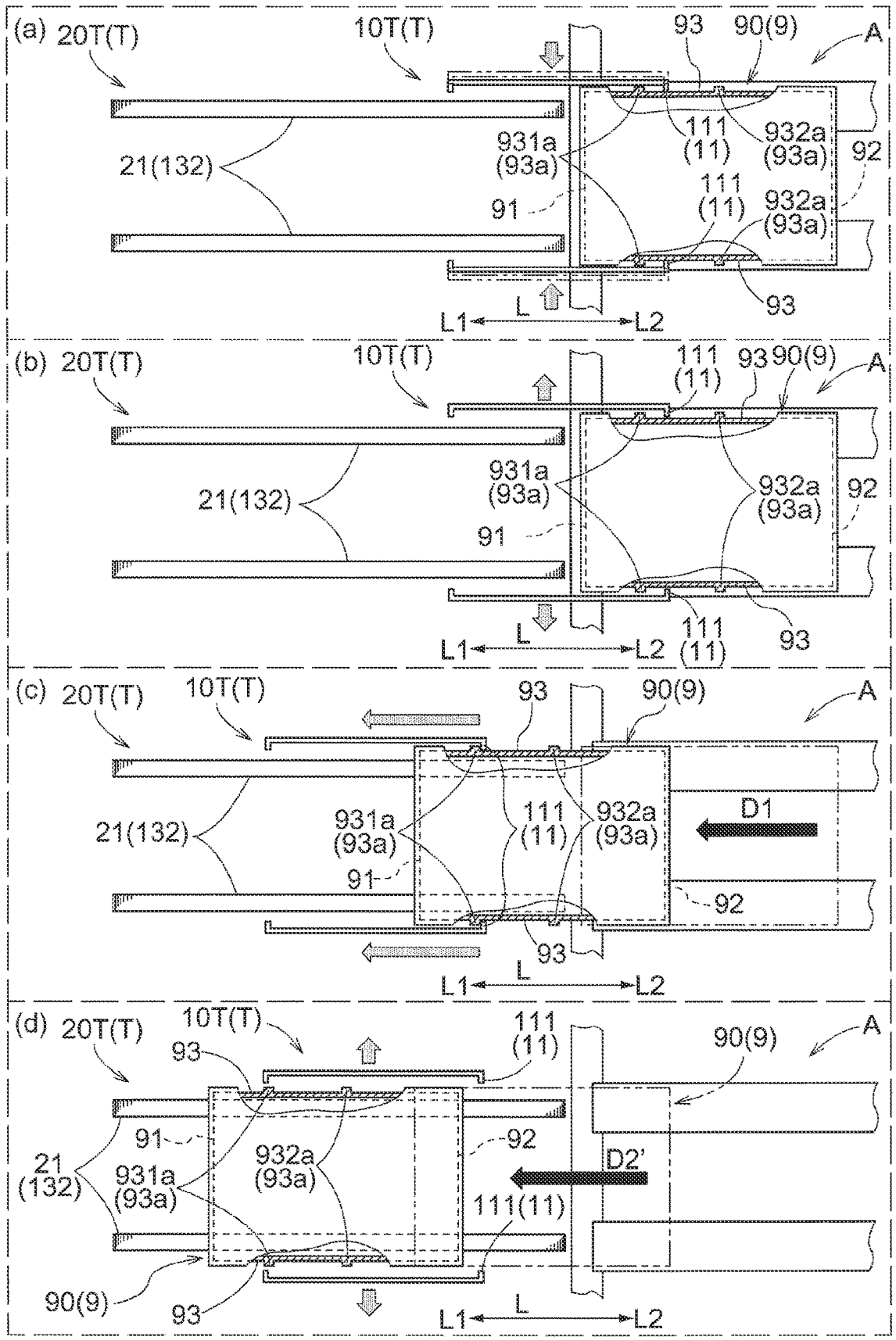
FIG. 8 is a diagram illustrating a receiving operation.
Figure 9:
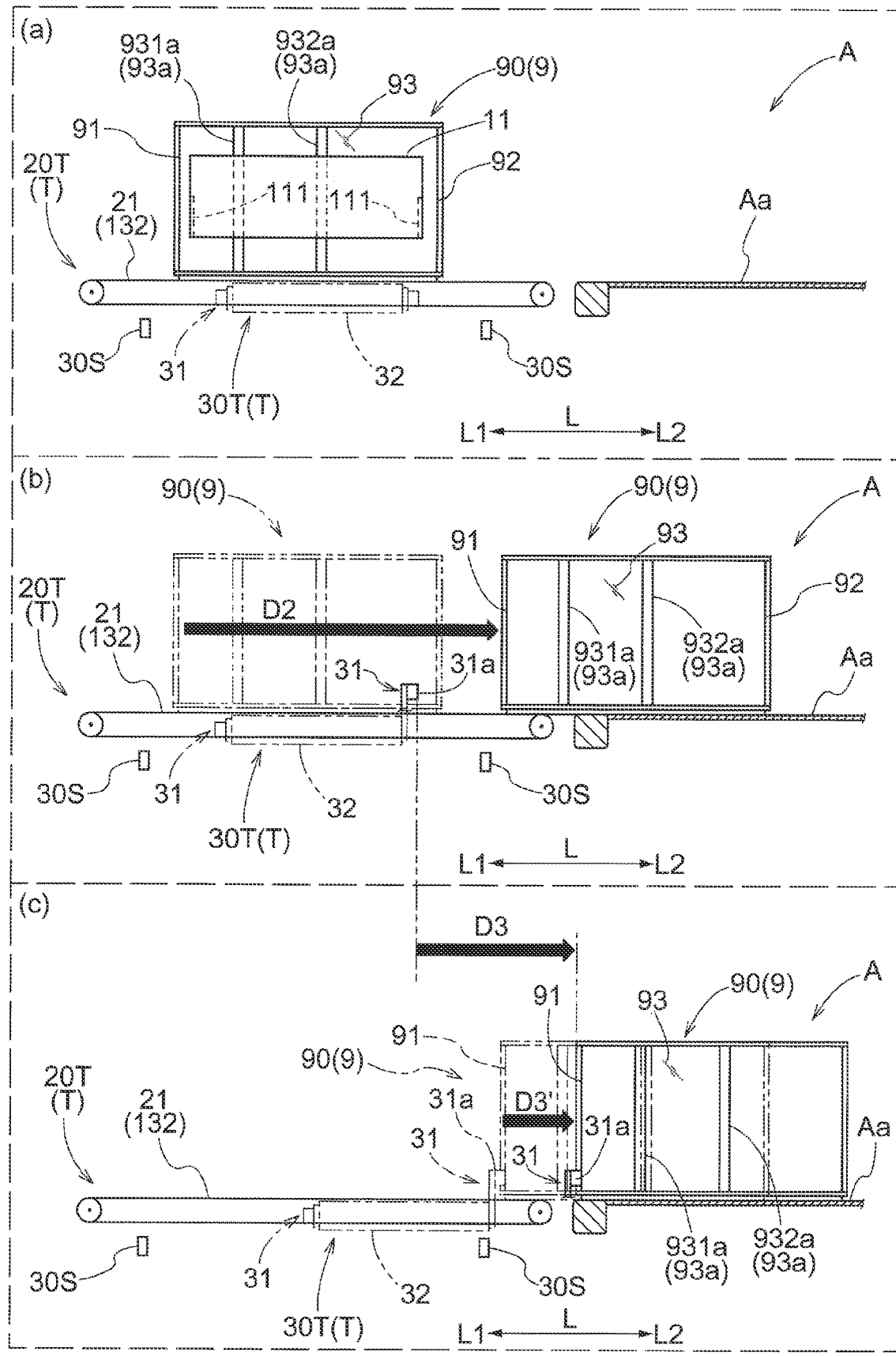
FIG. 9 is a diagram illustrating a delivery operation.

The transfer unit T is configured to perform a receiving operation to receive the target article 90 from a storage unit A and a delivery operation to pass the target article 90 to a storage unit A. In the present embodiment, the receiving operation is performed using the first transfer device 10T and the second transfer device 20T, and the delivery operation is performed using the second transfer device 20T and the third transfer device 30T. FIG. 8 is a diagram illustrating the receiving operation, and FIG. 9 is a diagram illustrating the delivery operation. Hereinafter, the receiving operation performed by the transfer unit T will be described with reference to FIG. 8, and the delivery operation performed by the transfer unit T will be described with reference to FIG. 9.

Receiving Operation

When performing the receiving operation, as shown in FIG. 8(a), the transfer unit T first places the pair of side arms 11 on both sides in the width direction W of the target article 90 stored in the storage unit A.

At this time, the transfer unit T causes the pair of side arms 11 to protrude toward the depth direction rear side L2 so that the locking portions 111 of the side arms 11 are located on the depth direction rear side L2 relative to the lock-target portions 93a (here, the first lock-target portions 931a) of the target article 90. Thereafter, from this state, the transfer unit T brings the pair of side arms 11 close to each other in the width direction W. As a result, the locking portions 111 of the side arms 11 are in contact with the side surface portion 93 of the target article 90, and the target article 90 is sandwiched (held) therebetween.

Here, as shown in FIG. 8(b), when the target article 90 is to be held by the pair of side arms 11, the transfer unit T brings the pair of side arms 11 close to each other in the width direction W until the pinching load detected by the load detector 10S (see FIG. 4) exceeds the predetermined value Vmax, and when the pinching load exceeds the predetermined value Vmax, the transfer unit T separates the pair of side arms 11 from each other by a predetermined distance in the width direction W, and thereafter stops the movement of the pair of side arms 11 in the width direction W. As a result, as described above, the positional relationship between the pair of side arms 11 and the side surface portion 93 of the target article 90 is set to be in a predetermined state. Then, from this state, by moving the pair of side arms 11 toward the depth direction front side L1, the transfer unit T locks the first lock-target portions 931a on the side surface portion 93 from the depth direction rear side L2, using the locking portions 111 provided on each of the pair of side arms 11.

Next, as shown in FIG. 8(c), in a state where the pair of locking portions 111 respectively lock the first lock-target portions 931a, the transfer unit T moves the pair of side arms 11 toward the depth direction front side L1 by a first transfer distance D1. Here, the first transfer distance D1 by which the target article 90 is to be moved by the first transfer device 10T is set to be shorter than a total transfer distance by which the target article 90 is to be moved toward in the depth direction L between the mounting unit 132 and the storage unit A. Therefore, if the target article 90 is simply moved by the first transfer device 10T by the first transfer distance D1, as shown in FIG. 8(c), a portion of the target article 90 protrudes from the mounting unit 132 toward the depth direction rear side L2, and the target article 90 does not come into the state in which the entire target article 90 is completely mounted on the mounting unit 132. Therefore, the transfer unit T uses the second transfer device 20T to move the target article 90 by the distance by which the first transfer distance D1 is shorter than the total transfer distance.

That is to say, as shown in FIG. 8(d), when performing the receiving operation, the transfer unit T moves the target article 90 toward the depth direction front side L1 by the first transfer distance D1 using the first transfer device 10T, and thereafter further moves the target article 90 toward the depth direction front side L1 by a remaining distance D2' obtained by subtracting the first transfer distance D1 from the total transfer distance, using the second transfer device 20T. The remaining distance D2' is the distance by which the target article 90 is moved by the second transfer device 20T through the receiving operation, and may be the same as, or different from, a second transfer distance D2 by which the target article 90 is moved by the second transfer device 20T through the delivery operation described below. Also, in this example, in order to prevent the pair of side arms 11 from interfering with the target article 90 while the target article 90 is being moved by the second transfer device 20T, the holding of the target article 90 by the pair of side arms 11 of the first transfer device 10T is released before the second transfer device 20T starts to move the target article 90. That is to say, when performing the receiving operation, the transfer unit T first transfers the target article 90 from the storage unit A toward the mounting unit 132 (the depth direction front side L1) by the first transfer distance D1 using the first transfer device 10T, thereafter releases the pair of side arms 11 from the state of holding the target article 90, and moves the target article 90 to the mounting unit 132, using the second transfer device 20T. As described above, the entire target article 90 is mounted on the mounting unit 132, and the receiving operation is complete.

As described above, with the above-described configuration, the first transfer distance D1 by which the target article 90 is moved by the first transfer device 10T is set to be shorter than the total transfer distance by which the target article 90 is moved between the mounting unit 132 and the storage unit A. Therefore, it is possible to reduce the amount of back and forth movement of the side arms 11 of the first transfer device 10T in the depth direction L. Therefore, it is possible to downsize the dimension of the side arms 11 in the depth direction L, and it is easier to secure the strength of the side arms 11 when they are in a state of protruding in the depth direction L. Therefore, for each of the pair of side arms 11 of the first transfer device 10T, it is possible to reduce the dimension in the width direction W while ensuring the required strength, and accordingly, it is possible to downsize the entire transfer device 13 in the width direction W.

Also, with the above-described configuration, it is possible to reduce the dimension of the side arms 11 in the width direction W, and therefore, it is possible to reduce the arrangement interval of the plurality of storage units A in the width direction W, and it is easier to improve the storage efficiency of the storage shelves 2 that includes a plurality of storage units A (see FIG. 1 and so on).

Delivery Operation

As shown in FIG. 9, in the present embodiment, the transfer unit T performs a delivery operation to move and deliver the target article 90 from the mounting unit 132 to a storage unit A, using the second transfer device 20T and the third transfer device 30T.

When performing the delivery operation, as shown in FIG. 9(*a*), the transfer unit T first moves the target article 90 mounted on the mounting unit 132 toward the center in the width direction W, using the pair of side arms 11. As a result, the target article 90 can be located at an appropriate position in the width direction W relative to the storage unit A before the target article 90 is transferred to the storage unit A.

Next, as shown in FIG. 9(*b*), the transfer unit T moves the target article 90 toward the depth direction rear side L2 by the second transfer distance D2, using the second transfer device 20T (here, the pair of belt conveyors 21). In the present embodiment, the second transfer distance D2 is set to be shorter than the total transfer distance. Therefore, if the target article 90 is simply moved by the second transfer device 20T by the second transfer distance D2, as shown in FIG. 9(*b*), only a portion of the target article 90 is stored in the storage unit A, i.e., a portion of the target article 90 on the depth direction front side L1 protrudes from the mounting unit 132 toward the depth direction front side L1, and the target article 90 does not come into the state in which the entire target article 90 is completely mounted on the mounting unit 132. Therefore, the transfer unit T uses the third transfer device 30T to move the target article 90 by the distance by which the second transfer distance D2 is shorter than the total transfer distance.

Therefore, in the present embodiment, while moving the target article 90 toward the depth direction rear side L2 by the second transfer distance D2, using the second transfer device 20T, or after moving the target article 90 by the second transfer distance D2, the transfer unit T changes the state of the pressing arms 31 to the protruding state when the target article 90 is located on the depth direction rear side L2 relative to the pressing arms 31 (see FIG. 9(*b*)). Note that, as described above, whether or not the target article 90 is located on the depth direction rear side L2 relative to the pressing arms 31 is detected by the position detection unit 30S. In this way, the transfer unit T sets the pressing arms 31 in the protruding state, thereby preparing to transfer the target article 90 using the third transfer device 30T.

Thereafter, as shown in FIG. 9(*c*), the transfer unit T further moves the target article 90 toward the depth direction rear side L2 by a remaining distance D3' obtained by subtracting the second transfer distance D2 from the total transfer distance, using the third transfer device 30T. In the present embodiment, by moving the pressing arms 31 by a third transfer distance D3, the third transfer device 30T moves the target article 90 by the remaining distance D3' that is the difference between the total transfer distance and the second transfer distance D2. The third transfer distance D3 is the movement distance of the pressing arms 31 moved by the third transfer device 30T toward the depth direction rear side L2, and is set to be shorter than the total transfer distance. As shown in the drawings, the third transfer distance D3 is longer than the remaining distance D3'. In this example, when performing the delivery operation, the transfer unit T moves the target article 90 from the mounting unit 132 toward the depth direction rear side L2 by the second transfer distance D2 that is longer than the difference between the total transfer distance and the third transfer distance D3, using the second transfer device 20T, thereafter changes the state of the pressing arms 31 from the retracted state to the protruding state (see FIG. 9(*b*)) in a state where the target article 90 is located on the depth direction rear side L2 relative to the pressing arms 31, and moves the pressing arms 31 in the protruding state toward the depth direction rear side L2, thereby moving the target article 90 to the storage unit A (see FIG. 9(*c*)). As described above, the entire target article 90 is mounted on the mounting unit 132, and the delivery operation is complete.

As described above, with the above-described configuration, the delivery operation is performed using mainly the second transfer device 20T and the third transfer device 30T, and therefore it is possible to reduce the role of the first transfer device 10T in the delivery operation. Also, the first transfer device 10T is not used for the operation performed to move the target article 90 toward the depth direction rear side L2 in the delivery operation. Therefore, it is easier to secure the strength of the pair of side arms 11 of the first transfer device 10T, and it is even easier to downsize each of the side arms 11 in the width direction W. As a result, it is possible to further downsize the entire transfer device 13 in the width direction W.

OTHER EMBODIMENTS

The following describes other embodiments of the transfer device.

(1) The above embodiment describes an example in which the transfer unit T performs the delivery operation to move and deliver the target article 90 from the mounting unit 132 to a storage unit A, using the second transfer device 20T and the third transfer device 30T. However, the present invention is not limited to such an example, and the transfer unit T may perform the delivery operation using the first transfer device 10T and the second transfer device 20T instead of the third transfer device 30T. For example, the transfer unit T may perform the delivery operation by first moving the target article 90 toward the depth direction rear side L2 by a predetermined distance using the second transfer device 20T (the pair of belt conveyors 21), and thereafter moving the target article 90 by the remaining distance using the first transfer device 10T (the side arms 11). In this case, for example, the transfer unit T may press the first surface portion 91 (or the second surface portion 92) of the target article 90 toward the depth direction rear side L2 using the side arms 11 of the first transfer device 10T, or press the lock-target portions 93a of the target article 90 toward the depth direction rear side L2, using the locking portions 111 of the side arms 11.

(2) The above embodiment describes an example in which the pressing arms 31 of the third transfer device 30T are supported on the base 32 so as to be rotatable about the axes that extend in the depth direction L, and the state thereof is changed to the protruding state and the retracted state through such rotation. However, the present invention is not limited to such an example, and the pressing arms 31 need only be configured to be movable to a position that overlaps the movement locus of the target article 90 and a position that does not overlap the movement locus. For example, the pressing arms 31 may be configured to slide relative to the base 32 (for example, slide in the vertical direction).

(3) The above embodiment describes an example in which, after the pinching load reaches the predetermined value Vmax, the first transfer device 10T moves the pair of side arms 11 outward in the width direction W so that each of the pair of side arms 11 is separated from the target article 90 with a gap, in consideration of the amount of bending of the side arms 11. However, the present invention is not limited to such an example, and the first transfer device 10T may be configured to move the pair of side arms 11 in the depth direction L to move the target article 90 in the depth direction L while keeping the state in which the pair of side arms 11 are in contact with the target article 90. In addition, the method for controlling the movement of the pair of side arms 11 in the width direction W is not limited to the above embodiment. For example, the inward movement of the pair of side arms 11 in the width direction W may be controlled based on the distance of the movement, or controlled based on the duration of the movement and the speed of the movement. Alternatively, the distance between the pair of side arms 11 and the target article 90 may be detected by a sensor or the like and controlled based on the result of the detection.

(4) The above embodiment describes an example in which the load detection unit 10S is configured to detect the pinching load in a state where the target article 90 is sandwiched between the pair of side arms 11, based on the drive torque output by the first opening and closing drive unit M12 (the first drive unit M10). However, the present invention is not limited to such an example. For example, the load detection unit 10S may be provided at each of the contact portions (the locking portions 111 in this example) that are in contact with the target article 90, of the pair of side arms 11, and configured as a pressure sensor that detects the pressure with which the pair of side arms 11 press the target article 90 from both sides in the width direction W.

(5) The above embodiment describes an example in which the pair of belt conveyors 21 of the second transfer device 20T constitute the mounting unit 132. However, the present invention is not limited to such an example, and, for example, the second transfer device 20T and the mounting unit 132 may be separately provided. In such a case, for example, it is preferable that the pair of belt conveyors 21 of the second transfer device 20T are configured to move in the vertical direction relative to the mounting portion 132 provided separately therefrom. Here, it is possible to employ a configuration in which either the pair of belt conveyors 21 or the mounting unit 132 moves in the vertical direction relative to the base portion 131, and the other is fixed to the base portion 131. It is preferable that, when the target article 90 is to be moved in the depth direction L, the pair of belt conveyors 21 move so as to be located at a position higher than the mounting unit 132 on which the target article 90 is to be mounted, to receive the target article 90 from the mounting unit 132.

(6) The above embodiment describes an example in which the second transfer device 20T includes the pair of belt conveyors 21 that arranged so as to be separate from each other in the width direction W. However, the present invention is not limited to such an example, and, for example, the second transfer device 20T may include roller conveyors instead of the pair of belt conveyors 21.

(7) The above embodiment describes, as an example, a configuration in which each of the pair of side arms 11 is provided with locking portions 111, and the pairs of locking portions 111 are locked to the lock-target portions 93a of the target article 90 in the depth direction L to hold the target article 90. However, the present invention is not limited to such an example. For example, it is possible to employ a configuration in which the pair of side arms 11 sandwich the target article 90 from both sides in the width direction W to hold the target article 90. In such a case, it is not necessary that each of the pair of side arms 11 is provided with the locking portions 111.

(8) Note that the configurations disclosed in the above embodiment may be applied in combination with the configurations disclosed in other embodiments as long as no contradiction arises. Regarding other configurations, the embodiments disclosed herein are merely exemplary in all respects. Therefore, various modifications can be made as appropriate without departing from the spirit of the present disclosure.

Summary of Above-Described Embodiment

The following describes the above-described transfer device.

A transfer device for transferring a target article to and from a storage unit that stores an article, the transfer device including:

a mounting unit on which the target article is to be mounted; and a transfer unit that transfers the target article between the storage unit and the mounting unit by moving the target article in a depth direction of the storage unit, wherein a direction that is orthogonal to the depth direction in a horizontal plane is defined as a width direction, the transfer unit includes a first transfer device that has a pair of side arms, holds the target article using the pair of side arms, and moves the target article in the depth direction, the pair of side arms being respectively provided on two sides, in the width direction, of the target article mounted on the mounting unit and move back and forth in the depth direction, and a second transfer device that moves a portion of the target article in the depth direction, the portion being mounted on the mounting unit, a first transfer distance by which the target article is to be moved by the first transfer device is shorter than a total transfer distance by which the target article is to be moved in the depth direction between the mounting unit and the storage unit, and the transfer unit uses the second transfer device to move the target article by a distance by which the first transfer distance is shorter than the total transfer distance.

According to this configuration, the first transfer distance by which the target article is moved by the first transfer device is set to be shorter than the total transfer distance that is the distance by which the target article is moved between the mounting unit and the storage unit. Therefore, it is possible to reduce the amount of back and forth movement of the side arms of the first transfer device in the depth direction. Therefore, it is possible to downsize the dimension of the side arms in the depth direction, and it is easier to secure the strength of the side arms when there are in a state of protruding in the depth direction. Therefore, with this configuration, it is possible to reduce the dimension in the width direction of each of the pair of side arms of the first transfer device while ensuring the required strength. As a result, it is possible to downsize the entire transfer device in the width direction.

In addition, when a plurality of storage units for storing articles are lined up in the width direction, it is necessary to set the arrangement interval in the width direction of the plurality of storage units so that the side arms that move back and forth do not come into contact with an article. With the configuration, it is possible to reduce the dimension of the side arms in the width direction, and therefore it is possible to reduce the arrangement interval of the plurality of storage units in the width direction, and it is easier to improve the storage efficiency of a storage place that includes the plurality of storage units.

Here, it is preferable that, when the transfer unit performs a receiving operation to move the target article from the storage unit to the mounting unit and receive the target article, the transfer unit moves the target article from the storage unit toward the mounting unit by the first transfer distance, using the first transfer device, thereafter releases the pair of side arms from a state of holding the target article, and moves the target article to the mounting unit, using the second transfer device.

With this configuration, it is possible to appropriately perform the receiving operation to move the target article from the storage unit to the mounting unit and receive the target article, using the first transfer device and the second transfer device.

In addition, it is preferable that surfaces of the target article that respectively face two sides in the width direction are defined as side surface portions, the pair of side arms are respectively provided with locking portions that are formed so as to protrude in the width direction and face each other, and the first transfer device holds the target article by bringing the pair of side arms close to each other in the width direction and locking the locking portions to lock-target portions that are provided on the side surface portions of the target article, and releases holding of the target article by separating the pair of side arms from each other in the width direction and releasing the locking portions from the lock-target portions.

With this configuration, it is possible to freely hold and release the target article by moving the pair of side arms in the width direction. Also, by locking the locking portions to the lock-target portions of the target article, it is possible to move the target article in the depth direction while holding the target article.

In addition, it is preferable that the mounting unit-side with respect to the storage unit in the depth direction is defined as a depth direction front side, and the storage unit-side with respect to the mounting unit in the depth direction is defined as a depth direction rear side, the transfer unit further includes a third transfer device, the third transfer device has pressing arms that press the target article from the depth direction front side, and is configured to move the target article toward the depth direction rear side, using the pressing arms, the pressing arms are configured to be able to freely change a state thereof to a protruding state in which the pressing arms protrude to positions that overlap a movement locus of the target article moved by the transfer unit, and a retracted state in which the pressing arms are retracted to positions that do not overlap the movement locus, a third transfer distance that is a movement distance of the pressing arms moved by the third transfer device toward the depth direction rear side is shorter than the total transfer distance, and the transfer unit performs a delivery operation to move and deliver the target article from the mounting unit to the storage unit, using the second transfer device and the third transfer device.

With this configuration, it is possible to appropriately perform the delivery operation to move the target article from the mounting unit to the storage unit and deliver the target article, using the second transfer device and the third transfer device. Also, when the target article is to be moved by the third transfer device, it is possible to move the target article using the pressing arms by bringing the pressing arms in a protruding state in which the pressing arms protrude to positions that overlap the movement locus of the target article. When the target article is not to be moved using the third transfer device, it is possible to prevent the pressing arms from hindering the movement of the target article by bringing the pressing arms into the retracted state so as not to overlap the movement locus of the target article.

Also, with this configuration, it is possible to reduce or eliminate the role of the first transfer device in the delivery operation. Therefore, it is easier to secure the strength of the pair of side arms of the first transfer device, and it is even easier to downsize each of the side arms in the width direction. As a result, it is possible to further downsize the entire transfer device in the width direction.

In addition, it is preferable that,
when performing the delivery operation,
the transfer unit moves the target article from the mounting unit toward the depth direction rear side by a second transfer distance that is longer than a difference between the total transfer distance and the third transfer distance, using the second transfer device, thereafter changes a state of the pressing arms from the retracted state to the protruding state in a state where the target article is located on the depth direction rear side relative to the pressing arms, and moves the pressing arms in the protruding state toward the depth direction rear side, thereby moving the target article to the storage unit.

With this configuration, when performing the delivery operation using the second transfer device and the third transfer device, it is possible to appropriately move the target article that has been moved by the second transfer device by the second transfer distance, to the storage unit, using the pressing arms, while preventing the pressing arms of the third transfer device from coming into contact with the target article that is being moved by the second transfer device.

In addition, it is preferable that
the first transfer device is configured to sandwich and hold the target article from both sides in the width direction by bringing the pair of side arms close to each other in the width direction,
the first transfer device further includes a load detection unit that detects a pinching load in a state where the target article is sandwiched by the pair of side arms, and
when the target article is to be held by the pair of side arms, the transfer unit brings the pair of side arms close to each other in the width direction until the pinching load detected by the load detector exceeds a predetermined value, and when the pinching load exceeds the predetermined value, the transfer unit separates the pair of side arms from each other by a predetermined distance in the width direction, and thereafter stops a movement of the pair of side arms in the width direction.

With this configuration, it is possible to appropriately hold the target article, using the pair of side arms, based on the result of the detection by the load detection unit. Also, with such a configuration, for example, even when handling a plurality of articles of the same type that have different holding target positions depending on the orientation in which they are arranged, or handling a plurality of types of articles that have different dimensions and shapes in the width direction, it is possible to appropriately hold various articles, using the pair of side arms without having to perform a different kind of control for each article.

INDUSTRIAL APPLICABILITY

The present invention is applicable to a transfer device for transferring a target article to and from a storage unit that stores an article.

DESCRIPTION OF REFERENCE SIGNS

13: Transfer Device
132: Mounting Unit
T: Transfer Unit
10T: First Transfer Device
20T: Second Transfer Device
30T: Third Transfer Device
10S: Load Detection Unit
11: Side Arm
111: Locking Portion
31: Pressing Arm
9: Article
90: Target Article
93: Side Surface Portion
93a: Lock-target Portion
D1: First Transfer Distance
D2: Second Transfer Distance
D3: Third Transfer Distance
Vmax: Predetermined Value
A: Storage Unit
L: Depth Direction
L1: Depth Direction Front Side
L2: Depth Direction Rear Side
W: Width Direction

The invention claimed is:
1. A transfer device for transferring a target article to and from a storage unit that stores an article, the transfer device comprising:
a mounting unit on which the target article is to be mounted; and
a transfer unit that transfers the target article between the storage unit and the mounting unit by moving the target article in a depth direction of the storage unit,
wherein a direction that is orthogonal to the depth direction in a horizontal plane is defined as a width direction,
wherein the transfer unit comprises:
a first transfer device that has a pair of side arms, holds the target article using the pair of side arms, and moves the target article in the depth direction, the pair of side arms being respectively provided on two sides, in the width direction, of the target article mounted on the mounting unit and move back and forth in the depth direction, and
a second transfer device that moves a portion of the target article in the depth direction, the portion being mounted on the mounting unit,
a first transfer distance by which the target article is to be moved by the first transfer device is shorter than a total transfer distance by which the target article is to be moved in the depth direction between the mounting unit and the storage unit, and
wherein the transfer unit uses the second transfer device to move the target article a distance which is the total transfer distance less the first transfer distance,
wherein the mounting unit-side with respect to the storage unit in the depth direction is defined as a depth direction front side, and the storage unit-side with respect to the mounting unit in the depth direction is defined as a depth direction rear side,
the transfer unit further comprises a third transfer device,
the third transfer device has pressing arms that press the target article from the depth direction front side, and is configured to move the target article toward the depth direction rear side, using the pressing arms,
the pressing arms are configured to be able to freely change a state thereof to a protruding state in which the pressing arms protrude to positions that overlap a movement locus of the target article moved by the transfer unit, and a retracted state in which the pressing arms are retracted to positions that do not overlap the movement locus, a third transfer distance that is a movement distance of the pressing arms moved by the third transfer device toward the depth direction rear side is shorter than the total transfer distance, and the transfer unit performs a delivery operation to move and deliver the target article from the mounting unit to the storage unit, using the second transfer device and the third transfer device, wherein the first transfer device and third transfer device are operated independently.

2. The transfer device according to claim 1, wherein when the transfer unit performs a receiving operation to move the target article from the storage unit to the mounting unit and receive the target article, the transfer unit moves the target article from the storage unit toward the mounting unit by the first transfer distance, using the first transfer device, thereafter releases the pair of side arms from a state of holding the target article, and moves the target article to the mounting unit, using the second transfer device.

3. The transfer device according to claim 2, wherein the pair of side arms are respectively provided with locking portions that are formed so as to protrude in the width direction and face each other, and wherein the first transfer device holds the target article by bringing the pair of side arms close to each other in the width direction and locking the locking portions to lock-target portions that are provided on the side surface portions of the target article, and releases holding of the target article by separating the pair of side arms from each other in the width direction and releasing the locking portions from the lock-target portions.

4. The transfer device according to claim 2, wherein the first transfer device is configured to sandwich and hold the target article from both sides in the width direction by bringing the pair of side arms close to each other in the width direction, wherein the first transfer device further comprises a load detection unit that detects a pinching load in a state where the target article is sandwiched by the pair of side arms, and wherein when the target article is to be held by the pair of side arms, the transfer unit brings the pair of side arms close to each other in the width direction until the pinching load detected by the load detector exceeds a predetermined value, and reduces the pinching load to be less than the predetermined value.

5. The transfer device according to claim 1, wherein surfaces of the target article that respectively face two sides in the width direction are defined as side surface portions, wherein the pair of side arms are respectively provided with locking portions that are formed so as to protrude in the width direction and face each other, and wherein the first transfer device holds the target article by bringing the pair of side arms close to each other in the width direction and locking the locking portions to lock-target portions that are provided on the side surface portions of the target article, and releases holding of the target article by separating the pair of side arms from each other in the width direction and releasing the locking portions from the lock-target portions.

6. The transfer device according to claim 5, wherein the first transfer device is configured to sandwich and hold the target article from both sides in the width direction by bringing the pair of side arms close to each other in the width direction, wherein the first transfer device further comprises a load detection unit that detects a pinching load in a state where the target article is sandwiched by the pair of side arms, and wherein when the target article is to be held by the pair of side arms, the transfer unit brings the pair of side arms close to each other in the width direction until the pinching load detected by the load detector exceeds a predetermined value, and reduces the pinching load to be less than the predetermined value.

7. The transfer device according to claim 1, wherein, when performing the delivery operation, and the transfer unit moves the target article from the mounting unit toward the depth direction rear side by a second transfer distance that is longer than a difference between the total transfer distance and the third transfer distance, using the second transfer device, thereafter changes a state of the pressing arms from the retracted state to the protruding state in a state where the target article is located on the depth direction rear side relative to the pressing arms, and moves the pressing arms in the protruding state toward the depth direction rear side, thereby moving the target article to the storage unit.

8. The transfer device according to claim 7, wherein the first transfer device is configured to sandwich and hold the target article from both sides in the width direction by bringing the pair of side arms close to each other in the width direction, wherein the first transfer device further comprises a load detection unit that detects a pinching load in a state where the target article is sandwiched by the pair of side arms, and wherein when the target article is to be held by the pair of side arms, the transfer unit brings the pair of side arms close to each other in the width direction until the pinching load detected by the load detector exceeds a predetermined value, and reduces the pinching load to be less than the predetermined value.

9. The transfer device according to claim 1, wherein the first transfer device is configured to sandwich and hold the target article from both sides in the width direction by bringing the pair of side arms close to each other in the width direction, wherein the first transfer device further comprises a load detection unit that detects a pinching load in a state where the target article is sandwiched by the pair of side arms, and wherein when the target article is to be held by the pair of side arms, the transfer unit brings the pair of side arms close to each other in the width direction until the pinching load detected by the load detector exceeds a predetermined value, and reduces the pinching load to be less than the predetermined value.

10. The transfer device according to claim 1, wherein the pressing arms of the third transfer device are arranged between the pair of side arms in the width direction.

* * * * *

UNITED STATES PATENT AND TRADEMARK OFFICE
CERTIFICATE OF CORRECTION

PATENT NO. : 12,103,769 B2
APPLICATION NO. : 17/441894
DATED : October 1, 2024
INVENTOR(S) : Takashi Fujita et al.

It is certified that error appears in the above-identified patent and that said Letters Patent is hereby corrected as shown below:

In the Claims

Column 22, Line 16, Claim 7, after "operation," delete "and"

Signed and Sealed this
Tenth Day of December, 2024

*Katherine Kelly Vidal*

Katherine Kelly Vidal
*Director of the United States Patent and Trademark Office*